July 22, 1952 R. M. WORREL 2,604,174
ROTOR CONTROL MECHANISM FOR ROTARY WING AIRCRAFT
Filed Jan. 8, 1946 3 Sheets-Sheet 1

INVENTOR
RICHARD M. WORREL
BY M. O. Hayes
ATTORNEY

July 22, 1952 R. M. WORREL 2,604,174
ROTOR CONTROL MECHANISM FOR ROTARY WING AIRCRAFT
Filed Jan. 8, 1946 3 Sheets-Sheet 2

INVENTOR
RICHARD M. WORREL
BY M. C. Hayes
ATTORNEY

July 22, 1952  R. M. WORREL  2,604,174
ROTOR CONTROL MECHANISM FOR ROTARY WING AIRCRAFT
Filed Jan. 8, 1946  3 Sheets-Sheet 3

INVENTOR
RICHARD M. WORREL
BY
ATTORNEY

Patented July 22, 1952

2,604,174

UNITED STATES PATENT OFFICE 2,604,174

ROTOR CONTROL MECHANISM FOR ROTARY WING AIRCRAFT

Richard M. Worrel, United States Navy, Fresno, Calif.

Application January 8, 1946, Serial No. 639,878

16 Claims. (Cl. 170—135.26)

(Granted under the act of March 3, 1883, as amended April 30, 1928; 370 O. G. 757)

This invention relates to rotary-wing aircraft and more particularly to control devices therefor.

The problems of control and stability have been among the most serious besetting the development and operation of rotary-wing aircraft. Present in gyroplanes such as Autogiros having freely rotating support wings, these problems are greatly aggravated in helicopters in which three dimensional movement of the aircraft is primarily dependent upon manipulation of the power driven rotating support wings or vanes. The present invention is described in terms of its helicopter adaptation, it being understood that it is also beneficially applied to the less complicated control of gyroplane rotor vanes.

The question of helicopter control is primarily that of inducing the rotor vanes to transmit to the craft supported thereby forces having components of the desired magnitude and direction. Vertical movements are generally accomplished by controlling the power applied to the rotor and over-all angles of attack of the rotor vanes. Accurate coordination between the two is highly desirable but difficult to attain with present known control systems.

Three methods of imparting horizontal movement to helicopters have met with some success. An early method comprised mounting the rotor vanes and driving motor therefor swivelly so as to permit the positioning of the motor-rotor assembly to give the desired direction of lift. This method had obvious disadvantages, not the least of which were the awkward and cumberous manipulation characteristics. A later, and more successful, control system involved mounting vertical and horizontal air screws on outriggers to tip the entire helicopter and thus its rotor to planes of rotation generating the desired horizontal components of force. This resulted in obvious inefficiencies of operation.

More recently, a more efficient method of inducing the desired horizontal components of force has been introduced. In this latter improved method, the angles of attack of the rotor vanes are increased through predetermined arcs of the rotational paths and proportionately reduced through arcs of rotation opposite thereto.

This improved system, known as cyclical pitch control, is also referred to as azimuth, sectional pitch, direct pitch, progressive pitch and reflex control. The conventional means of accomplishing cyclical pitch control are briefly these: Just below the rotor mounting hub a pair of plates are swivelly mounted on the main rotor shaft in sandwich relation to each other. The sandwich filling is a bearing permitting the upper plate to rotate with the main rotor shaft while the lower plate remains stationary. Push-pull link rods connect the top plate to pitch arms on the rotor vanes. When the plates are maintained in a position at right angles to the rotor shaft the rotor vanes turn without changing pitch. If however the lower plate is tilted, the upper plate assumes a parallel plane of rotation. The push-pull link rods are moved longitudinally as they traverse the tipped plane of rotation. This push-pull action is transmitted to the pitch rods to control rotor vane angle of attack in relation to radial position.

Certain difficulties are incident to this means of achieving azimuthal control. For example the manipulation of the numerous requisite control means is complicated. The desired coordination between applied power, lift, and horizontal components of force is difficult to achieve. Lateral control is hypersensitive. Vibration is caused by the push-pull rods. Independent cushioning means or hydraulic dampers are required. No automatic coordination between applied power and rotor vane angles of attack is provided. No automatic reduction of angles of attack for autorotation is provided upon power failure. These and other difficulties have led to the development of the present invention for accomplishing cyclical pitch control.

The present invention has for an object the providing of an improved rotor vane mounting and control system conducive to the dexterous operation of rotor-wing aircraft.

Other objects of the present invention are to simplify controls for rotor-wing aircraft; to provide improved means for controlling the angles of attack of rotor vanes; to provide cushioning rotor vane control; to eliminate hypersensitivity in lateral helicopter control; to provide for automatically regulating angles of attack of rotor vanes for auto-rotation upon a failure of power supply; to provide an hydraulic control system for achieving cyclical pitch control; to provide selectively adjustable automatic coordination between rotor vane angles of attack and the driving power applied to the rotor; to eliminate azimuth plate control means and difficulties incident thereto; to provide hydraulic damping of vibration, caused for example, by ground resonance; and to provide a safe, economical, and expeditious control system for aircraft supported by rotor-wings.

In accomplishing these and other objects of the present invention, I have provided improved details of structure, the preferred forms of which are illustrated in the accompanying drawings, wherein.

Figure 1:
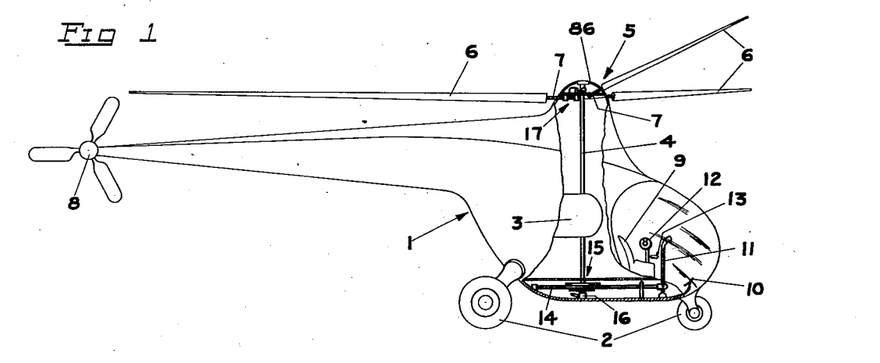
Fig. 1 is a side elevational view of a single rotor helicopter in which an embodiment of the present invention is employed for control purposes, a portion of the fuselage and rotor hub fairing thereof being removed to reveal the embodiment in operating position.

Referring more in detail to the drawings:

In Fig. 1 the general arrangement of the component parts of a conventional helicopter are indicated in light line. A fuselage thereof is indicated generally at 1. At tricycle type landing gear 2 is provided for ground support of the helicopter. A motivating means 3 generally comprises an engine, clutch and free-wheeling transmission. A main rotor shaft 4 extending above and below the motivating means 3, is employed to transmit power developed by the motor. The shaft extends above the fuselage of the helicopter to mount rotor vanes and extends downwardly from the motivating means to mount control activating assemblies.

A main rotor is indicated generally at 5 comprising a plurality of vanes or wing sections 6 rotatably mounted and controlled by means of spars 7. A tail rotor 8 to counteract torque of the main rotor and to assist in lateral control is mounted in the tail portion of the fuselage 1. A conventional seat 9; rudder pedals 10, to control the effect of the propeller 8; a joy stick 11, for azimuthal control; a climb adjustment mechanism 12; and an engine speed control 13 are shown.

In heavy lines, Fig. 1, an embodiment of the present invention is shown comprising in general, a control yoke 14, an hydraulic activating assembly 15, a monitor elevation control assembly 16, and pitch control and rotor mounting hub assembly 17, providing control communication between the joy stick 11 and the rotor vane spars 7.

Figure 2:
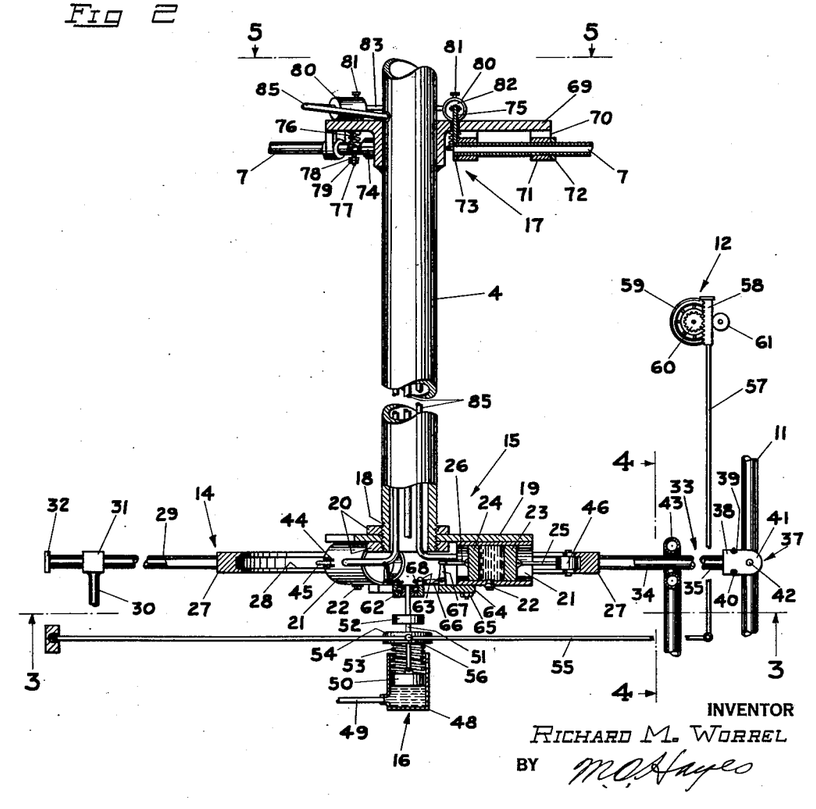
Fig. 2 is a side elevational view of the embodiment of the present invention, a portion thereof being shown in vertical cross section along the longitudinal axis of the aircraft. For purposes of clarity, the mounting and control mechanism is removed from the aircraft, as shown in Fig. 1, and enlarged.

The hollow cylindrical rotor shaft 4 is interrupted in Fig. 2 in order to illustrate the end portions and elements supported thereon in closer proximity. The rotor shaft is preferably a single unit from the activating assembly to the hub assembly so that fluid communication between relatively moving parts need not be provided. The rotor shaft is supported and driven by the motivating means 3 in any of several conventional methods not a part of this invention. The free-wheeling transmission previously referred to as comprising an element of the motivating means permits the rotor shaft to turn freely upon any interruption of applied power from the said motivating means. The rotor shaft is positioned so as to extend a distance upwardly from the motivating means sufficiently to mount the rotor vanes 6 and spars 7 clear of the fuselage 1 and below said motivating means a distance sufficient to position the hydraulic activating assembly 15 and control yoke 14 in a position in convenient proximity to the joy stick 11. The lower end portion of the rotor shaft is preferably screw threaded as at 18 in Fig. 2 to facilitate adjustable support for the hydraulic activating assembly 15.

The hydraulic activating assembly 15 comprises an azimuth plate 19 mounted on the rotor shaft in a plane substantially at right angles thereto. A pair of lock nuts 20 are screw threadedly engaged to the lower end portion of the rotor shaft to adjustably mount, and to secure therebetween when so mounted, the azimuth plate.

Hollow control cylinders 21 are secured to the azimuth plate in radial positions. At a lower portion of each control cylinder a drain plug 22 is provided to drain the hydraulic system. Substantially fluid-tight outwardly disposed control pistons 23 are slidably mounted in the control cylinders. Similar control pistons 24 are slidably mounted in the cylinders in inwardly disposed positions. Connecting rods 25 are articulately connected to the outwardly disposed control pistons and connecting rods 26 are articulately connected to the inwardly disposed pistons.

Figure 3:
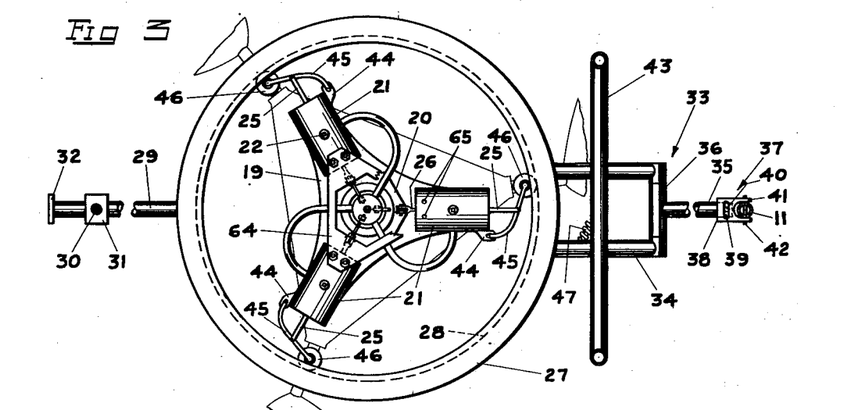
Fig. 3 is a bottom plan view of the hydraulic activating assembly and manipulating yoke portions of the rotor vane mounting and control mechanism looking upwardly from the line 3—3, Fig. 2. A portion of the positioning plate is broken away to reveal inner working parts of the activating assembly. In light line, the hub assembly is shown to illustrate relative positioning thereof.

An annular race element 27 is positioned circumjacent the radially disposed control cylinders 23. The race element has a track portion 28 formed on its inwardly disposed surface. In as much as the race element bears a control relationship to the outwardly disposed pistons it is necessary to provide an accurate support and positioning means therefor. To this end, a support arm 29 is radially extended from the race element. A pillow block 30 is mounted in the fuselage of the aircraft. A bearing 31 is pivotally mounted therein, slidably embracing and supporting the arm 29. The support arm 29 is free to rotate within the bearing 31 and to pivot therewith. A stop 32 is preferably secured to the end portion of the support arm to preclude the disengaging of the arm from the bearing during operation of the aircraft. A manipulating element 33 is secured to the race element 27. The manipulating element preferably has a bifurcated portion 34 and an articulated extended end portion 35. The articulation is provided by a bearing means 36 as shown in Fig. 3. A universal connector 37 links the extended end portion to the joy stick 11. The said end portion is rotatably engaged within a hollow cylindrical portion 38 of the universal connector. The cylindrical portion has peripheral openings 39 formed therein. To maintain the manipulating element engaged within the universal connector, a securing pin 40 is passed through the peripheral openings and secured to the said manipulating element. A pair of cooperatively employed flanges 41 engage the joy stick 11 and are pivotally secured thereto by means of the lock pin 42.

Figures 4, 5, 6:
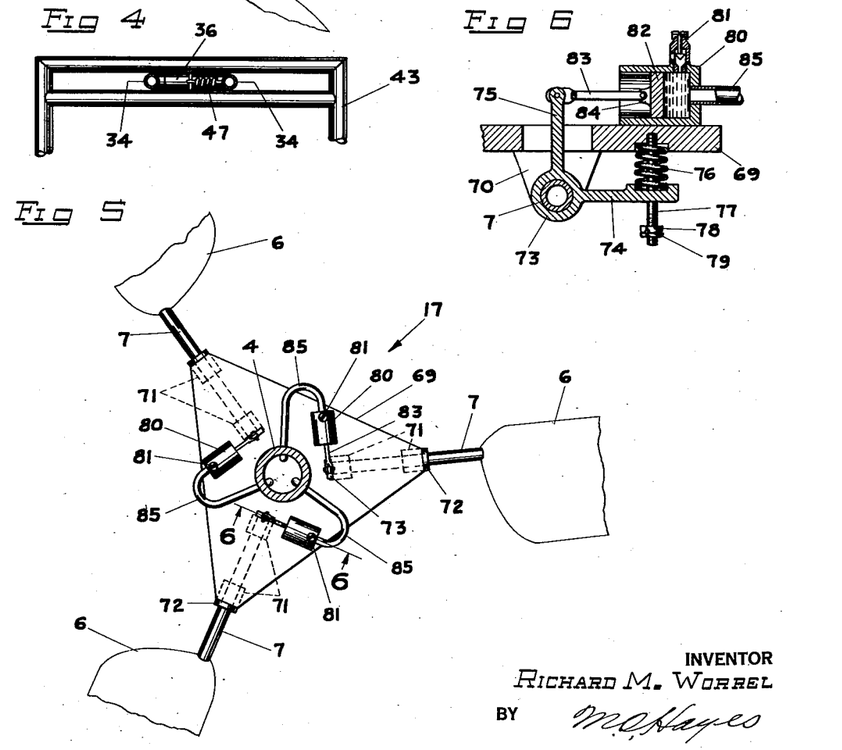
Fig. 4 is a longitudinal side elevational view of the slide support showing a portion of the yoke embraced thereby, taken on the line 4—4, Fig. 2.
Fig. 5 is a top plan view of the hub assembly portion of the rotor vane mounting and control mechanism taken on the line 5—5, Fig. 2.
Fig. 6 is a longitudinal sectional view of the manipulating means for the spars of the rotor vanes taken on the line 6—6, Fig. 5.

To provide further support for the yoke 14 a slide support 43, as shown in elevation in Fig. 2 and Fig. 4, is provided slidably to embrace the bifurcated portion 34 of the manipulating element. The support provided at points of contact on the two legs of the bifurcated portion and the pivotally mounted bearing 31 for the arm 29 comprise three supporting points supporting the race element 27 and substantially constraining manipulation thereof to a single predetermined plane.

Flanges 44 are formed on the sides of the control cylinders 21. Drag levers 45 are mounted on the cylinder flanges to pivot substantially in the plane of rotation thereof. Rollers 46 are rotatably mounted on the outer end portion of the drag levers. The rollers have circumscribing enlarged portions to engage within the track 28 and assist in positioning the rollers as they revolve with the rotation of the azimuth plate 19 and as they rotate on the respective drag levers 45. The drag levers are articulately connected to the outwardly disposed connecting rods 25 as shown in Fig. 3. The rollers, drag levers and connecting rods provide a mechanical linkage for positioning the outwardly disposed pistons 23 in response to the azimuthal position of the rollers as they engage the race element 27 during rotation of the azimuth plate.

The rotation of the azimuth plate 19 and supported elements within the race element 27 induces a torque effect to the yoke 14 tending to cause the joy stick to wander from neutral position. Base pressures applied to the hydraulic systems, speed of rotation of the azimuth plate, and displacement of the race element vary the torque effect. Increased base pressures and increased speed of rotation increases the torque effect. Displacing of the race element forwardly increases the pressures exerted by the rollers 46 on the race element during their rearward arc of revolution and proportionately reduces the pressures during their forward arc of revolution. This tends to move the race element, yoke, and joy stick in the direction of movement of the rollers in the rearward arc, upwardly as viewed in Fig. 3. Similarly, displacing of the race element rearwardly tends to move the race element, yoke, and joy stick in the opposite direction, downwardly as viewed in Fig. 3. In as much as the bearing 31 acts as a fulcrum for such movement of the yoke, torque effect of rollers in the forward arc of revolution has a greater mechanical advantage than the torque effect of rollers in the rearward arc of revolution. It is of course recognized that the mechanical advantage varies as the yoke member is slid back and forth in the bearing 31. The variation, however, is negligible in a consideration of torque compensation. Many methods of compensating for the torque effect have been contemplated. A simple means providing acceptable performance is indicated in Figs. 3 and 4. Practically, the problem is viewed as one for compensating for the mechanical advantage possessed by rollers in the forward arc of revolution. A helical tension spring 47 is secured at one end to the slide support between the two legs of the bifurcated portion 34 of the yoke. The other end thereof is secured to one of the legs at a point aft of the slide support when the joy stick is in neutral position. The distance aft is determined with reference to the fact that the spring compensation effect must be reduced as the race element and yoke are moved forwardly and increased proportionately as they are moved rearwardly. The spring 47 is of a strength to compensate the torque effect at normal rotor operating speeds and at normal pressures in the hydraulic systems. This means of compensating for torque is merely one of many that may be employed. In many instances, the torque is of such minor effect, no compensating means at all need be employed.

A monitor cylinder 48 is mounted in the fuselage 1 of the aircraft in a position coaxially aligned with the axis of rotation of the rotor shaft 4. A fluid conductor 49 is employed to communicate between the chamber of the monitor cylinder and the pressure lubrication system of the engine of the motivating means 3. A monitor piston 50 is slidably mounted within the monitor cylinder. A connecting rod 51 is secured to the monitor piston. A positioning bearing 52 is employed slidably to maintain the connecting rod aligned with the axis of rotation of the rotor shaft.

It is desirable to be able to adjustably control the ratio between variations in engine lubrication pressure and resultant connecting rod movement. This may be accomplished in several ways; by varying the ratio between fluid pressure impressed upon the monitor piston and engine lubrication pressures such as by means of pressure regulators; by varying the ratio of movements of the connecting rod and monitor piston, as by linking them through a lever whose mechanical advantage is variably controlled by a movable fulcrum; and in many other ways. The present embodiment contemplates accomplishing the said variation by providing adjustable resistance to the upward movement of the said piston and connecting rod.

A helical spring 53 is preferably placed in a position circumscribing the connecting rod 51; one end of the spring resting on the monitor piston. A spring cap 54, circumscribing the connecting rod 51, engages the opposite end of the spring. To adjustably control the spring pressure exerted upon the monitor piston, a lever 55 is pivotally mounted in the fuselage 1 of the aircraft. The said lever has an opening formed therein to fit around the spring cap 54. A bolt 56 is employed to pivotally secure the cap within the said opening. Conveniently to raise and lower the free end of the lever 55 and thereby adjustably control the spring pressure resistive to upward movement of the monitor piston, an elevator arm 57 is articulately connected thereto and upwardly disposed. The upward end portion of the elevator arm is provided with a rack gear as at 58.

An elevator wheel 59, comprising a part of the climb adjustment mechanism, is rotatably mounted in convenient proximity to the operator's position in the aircraft. The elevator wheel is provided with a pinion gear 60 secured thereto. To maintain the gear teeth 58 in engagement with the gear 60, a positioning bearing 61 is mounted in the fuselage of the aircraft so as to bear against the elevator arm. Thus the elevator wheel is mechanically linked to the spring cap to vary the spring pressure impressed upon the monitor piston in response to rotational position of the elevator wheel.

A thrust bearing 62 is mounted on the upwardly disposed end portion of the connecting rod 51 by having the inner race portion thereof secured to said connecting rod. Ears 63 are secured to the outer race of the said bearing 62 in upwardly disposed positions in planes radial to said bearing. So mounted the ears 63 may transmit components of the longitudinal motion of the connecting rod 51 to mechanisms rotating independently of the said connecting rod.

A bell crank positioning plate 64, as shown in Fig. 2 and Fig. 3, is mounted upon the lower portions of the control cylinders 21 by stud bolts 65. Positioning ears 66 are formed on the bell crank positioning plate. Bell cranks 67 are pivotally mounted therebetween. The inwardly disposed legs of the bell cranks are slotted as at 68. The bell cranks are articulately and slidably connected to the ears 63 through the slotted portions 68. The upwardly extending end portions of the bell cranks are articulately connected to the inwardly disposed connecting rods 26 thereby forming a mechanical linkage for translating longitudinal movement of the monitor piston, in response to engine lubrication pressure, into radial extension and retraction of the inwardly disposed control pistons 24 in opposition to the manually controlled, resistive spring pressure of the spring 53. The positioning ears provide a channel for each bell crank restricting movement thereof substantially to the pivoting planes thereof. This causes the outer bearing race of the thrust bearing 62 to rotate with the bell crank positioning plate, control cylinders, and azimuth plate.

In the hub assembly 17, a hub element 69 comprising the foundation for the pitch control and rotor mounting hub assembly 17, is secured, as by welding, to the rotor shaft 4 at the upper end portion thereof. Pillow boxes 70 and spar bearings 71, as shown in Fig. 6, are mounted on the hub element. The spars 7 are rotatably supported by the spar bearings in radial relation to the hub element. The angles of dihedral at which the vanes are mounted determines the relative lengths of the pillow boxes supporting the bearings for each spar. No vertical articulation, providing vertical movement of the vanes 6 during rotation, is provided in the mounting of the spars. Such articulation may be provided as desired by flexibility in the spars. Such articulation does not comprise a part of the present invention. Lock rings 72 preferably circumscribe the spars and are secured thereto in a position abutting the outer spar bearings to preclude any possible inward movement of the spars. Thrust rings 73 preferably circumscribe the inner end portion of the spars and are secured thereto in an abutting relationship to the inner spar mounting bearings and in cooperation therewith prevent the spars from being thrown outwardly by centrifugal force during rotation. To control the rotational position of the spars and thus the angles of attack of the rotor vanes feathering arms 74 and pitch arms 75 are radially extended from the thrust rings 73 and are fixedly attached thereto. As indicated in Fig. 6, the feathering arms are below the hub element 69, extend in the direction of rotation of the hub element, and are in a plane substantially parallel to the hub element during average operational conditions. Openings are formed in the hub element above the spars. The pitch arms extend through the openings in a substantially vertical position during average flight conditions.

The centers of lift of the rotor vanes being provided rearward of the spars, the rotor vanes tend to flatten out with respect to their plane of rotation during such rotation. To increase this tendency, to provide a resilient means against which control forces presently more fully described may operate, and to provide a means for maintaining the rotor vanes in an approximately normal position when the rotor vanes are not in operation; helical feathering springs 76 are provided between the feathering arms and the hub element resistive to increased angles of attack of the rotor vanes. To assist in positioning the feathering spring, spring receptacles are formed in the hub element and in the outwardly extended end portions of the feathering arms.

As is well known in the art, the rotor vanes of helicopters in which the applied power has been interrupted and the rotor vanes in gyroplanes in which power is not applied to the rotor vanes during flight; the said vanes are rotated by their passage through the air. This phenomenon of autorotation, essential to gyroplane support, is one imparting highly desirable safety factors to the operation of aircraft supported by power driven rotary means. Suffice it to consider at this point, that the said rotation will be induced in a rotor vane in the proper direction as long as the center of lift of such a vane remains in front of the axis of rotation thereof. When so positioned, the lift imparts to the rotor vane not only a vertical lift component for support purposes but a horizontal component effecting vane rotation as well. These forces of lift are dictated by the shape and design of the rotor vanes and by the angles of attack of the vanes during rotation. Although affected by shape and design of the rotor vanes, the critical angle of attack of the vanes best suited to achieving autorotation has been found to be between two and five degrees, greater or lesser angles of attack being found to produce progressively less autorotational effect. To the end of limiting feathering of the rotor vanes to angles of attack best suited to autorotation, stud bolts 77 are secured to the hub element in positions circumscribed by the feathering springs 76. Openings are formed in the feathering arms permitting the stud bolts to pass therethrough. Limiting nuts 78 and lock nuts 79 are screw threadedly adjusted and locked on the extended portions of the stud bolts.

Translation cylinders 80 are secured to the hub element so as to have their longitudinal axes substantially at right angles to the spars and substantially in the planes of movement of the pitch arms. Bleeding and filling valves 81 are mounted on the upper portions of the cylinders in fluid communication with the chambers of the cylinders.

Substantially fluid-tight pistons 82 as shown in Fig. 6, are slidably mounted in the translation cylinders. Connecting rods 83 are articulately connected to the pistons by means of wrist pins 84, as shown in Fig. 6. The connecting rods are also articulately connected to the free end portions of the pitch arms 75, thus providing a mechanical linkage translating inward movement of the pistons into increased angles of attack of the rotor vanes in opposition to the feathering effect of the springs 76.

The hub element being secured to the rotor shaft, adjustment of the relative positions of the hub element and the azimuth plate is accomplished by rotatably adjusting the azimuth plate on the rotor shaft. The adjustment is preferably made to locate the radially extended spars, in the hub element, in vertical planes of the rotor shaft and axes of rotation of the rollers 46. The preferred position is indicated in Fig. 3.

Fluid conductors 85 are employed to achieve fluid tight communication between each of the translation cylinders and their respective control cylinders. The linkage is established between the control cylinders and hydraulic cylinders whose rollers and spars respectively lie in common planes, as previously described. Said fluid conductors lead through the hollow inner portion of the rotor shaft 4 and are protected thereby.

In Fig. 1, a spinner cap 86 is shown as it is employed to house and to streamline the hub assembly. The rotor shaft 4 is extended upwardly beyond the hub assembly to mount the spinner. Such housing, streamlining, and mounting are useful incidental adjuncts to the present invention but not necessary component parts thereof.

Operation

The operation of a control device for rotary-wing aircraft constructed as described is as follows:

To fill the hydraulic systems, the joy stick is positioned in a substantially vertical attitude for centering the race element 27, Fig. 2, on the azimuth plate 19 and positioning all of the outwardly disposed control pistons 23 correspondingly within the control cylinders 21. Hydraulic fluid is funneled or pumped into the several hydraulic systems through the bleeding and feeding valves 81. The drain plugs 22 are opened briefly to eliminate air traps in the systems and then secured. Care is exercised to fill each system to the same pressure before the valves 81 are secured. The valves 81 are also utilized to emit, or bleed, air from the systems. It is preferably to conduct the filling operation while the engine is not running. This permits the monitor piston 50 to be at its lowest point which in turn expands the control cylinder chambers to their maximum by positioning the inwardly disposed control pistons 24 at their innermost points.

The monitor cylinder 48, being in fluid communication with the pressure lubrication system of the engine of the aircraft, the monitor piston 50 moves in response to engine speed, the slower the engine runs, the more retracted is the connecting rod 51. The faster it runs, the more extended is the said connecting rod. The exact positions taken by the said connecting rod at the various engine speeds is also affected by the adjustment of the elevator wheel 59. When the elevator wheel is rotated to lower the arm 57, lever 55, and cap 54, the downward pressure of the spring 53 is increased and the upward movement of the pistons 50 and connecting rod 51 are proportionately reduced. This is at least in part due to the fact that the lubrication pump in the engine operates increasingly inefficiently under increased back pressures applied thereto.

With this coaction of spring pressure and lubrication pressure in mind, it can readily be seen that two methods, or various combinations thereof may be employed to cause the aircraft to ascend or descend. When the elevator wheel is maintained at a constant position, elevational control may be accomplished by varying the engine speed. As the engine speed is increased, the lubrication pressure also increases and the lubricating fluid forces the connecting rod 51 upwardly. This upward movement is translated into radial movement of the inner control pistons 24 by the bell cranks 67 and connecting rods 26. The inward movements of the pistons 24 increase the hydraulic pressures in the control cylinders 21 which in turn are communicated to the translation cylinders 80 by the fluid conductors 85 to force the translation pistons 82 outwardly. Such movement of the pistons is transmitted to the spars through the connecting rods 83, Fig. 6, and the pitch arms 75 to increase the angles of attack of the rotor vanes 6 and to compress the springs 76. Similarly, by reducing engine speed, the angles of attack are reduced. Thus ascending and descending can be accomplished by manipulating the engine speed. If the engine speed is constant, ascending and descending may be accomplished by adjusting the elevator wheel 59. To climb, the wheel is rotated to raise the cap 54 and reduce the spring pressure opposing upward movement of the monitor piston 50. This results in an upward movement of the said monitor piston which is translated in the described manner into increased angles of attack for the rotor vanes. To descend, the wheel 59 is rotated in the opposite direction to lower the cap, increase the spring pressure, and reduce the over all angles of attack. In actual practice, the two elevational control means are cooperatively employed. The operation to this point has been concerned only with vertical movement and has presupposed the maintaining of the race element 27 in a position coaxial to the axis of rotation of the rotor shaft, a supposition in no way prerequisite to elevational control.

Horizontal movement is achieved by inclining the joy stick 11 in a direction in which movement of the aircraft is desired. To move rearwardly, the joy stick is pulled back. The rearward movement of the joy stick is transmitted to the race element 27 through the universal connector 37 and the manipulating element 33 to move the race element rearwardly. As the azimuth plate 19 rotates within the displaced race element, the outer control pistons 23 are positioned inwardly when their respective rollers 46 are in the forward arc of rotation and are outwardly positioned when their respective rollers are in the rearward arc. This movement of the control cylinders results in the superimposing of individual pressure variables for each hydraulic system upon a base pressure supplied by the elevator assembly 16. The additive pressures are transmitted to the hydraulic cylinders 80 in the hub assembly 17, to effect individual variations in the rotor vane angles of attack in response thereto.

In a similar manner, movement of the joy stick 11 in any direction results in controlled variations of the angles of attack of the rotor vanes, resulting in a horizontal movement of the aircraft in the direction of movement of the joy stick. The magnitude of change in the angles of attack are, however, not equally induced for all directions of movement of the joy stick. Because the control yoke 14 is pivotally and slidably mounted in the bearing 31, movement of the joy stick 11 to either side imparts a proportionately smaller movement to the race element 27 than does forward or rearward movement of the joy stick. Sensitivity of horizontal control is thus seen to achieve its maximums in fore and aft movement and its minimums in lateral movement thus obviating present known hypersensitive lateral control.

It has been found that rotor vanes of the character described operate more efficiently when there is a horizontal component of movement relative to the supporting air. Thus, if a constant elevation is to be maintained when horizontal movement is imparted to the aircraft, the engine speed must be reduced or the elevator wheel 59 mainipulated to reduce the base pressure impressed on the hydraulic systems.

A valuable safety feature of gyroplanes, as previously discussed, is that upon failure of power supply they may descend by autorotation. When the power supply fails in a helicopter a quick change of the over all angles of attack of the rotor vanes to that best suited to autorotation must be accomplished. In the present invention the change is accomplished automatically. When the engine stops, the lubrication pressure in the monitor cylinder 48 decreases and the monitor piston 50 returns to rest. Through the previously explained linkage, translating vertical movement of the monitor piston into radial movement of the inner control pistons, this relieves the base pressure impressed on all the hydraulic systems. The feathering springs unopposed under such conditions, feather the vanes to the predetermined proper position for autorotation according to the predetermined settings of the limiting nuts 78 and lock nuts 79.

Modification 1

By mounting coaxial counter rotating rotors on aircraft of the character described the need for the torque counteracting tail rotor 8 is eliminated.

Figures 7, 8:
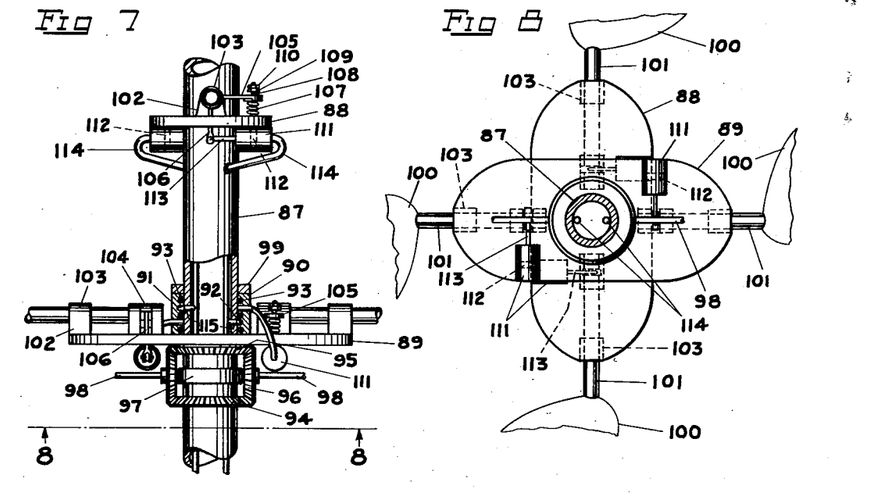
Fig. 7 is a side elevational view of a modification of the present invention, a portion of the rotor shaft and mounting bearing being shown in vertical cross section to indicated certain fluid connections. By positioning the oppositely rotating hub assemblies in right angle relationship, end views and side views of similar respective parts are revealed.
Fig. 8 is a bottom plan view of the said modification looking upwardly from line 8—8, Fig. 7 and showing the hub assemblies and rotor vanes.

In Figs. 7 and 8, a modification of the present invention is provided to adapt the hub assembly of the present invention to mount and control coaxial-counter-rotating rotors. A portion of the rotor shaft and mounting supported thereon is broken away to show internal details of the structure.

A rotor shaft 87 is provided similar to the rotor shaft 4 in the preferred embodiment. An upper hub element 88 is secured to the rotor shaft. A lower hub element 89, similar to the upper hub element is mounted to rotate freely on the rotor shaft. The lower hub element is mounted by means of a fluid transfer bearing 90 having a pair of annular channels or fluid transfer rings, 91 and 92 formed on its inwardly disposed surface. To preclude loss of hydraulic fluid, packing rings 93 are mounted in the bearing in substantially fluid tight contact with the rotor shaft.

To assist in positioning the lower hub element and to rotate it upon the rotor shaft, cooperatively employed gear elements are provided. A bevel gear 94 is secured to the rotor shaft, upwardly disposed, below the lower hub element. A similar bevel gear 95 is secured to the lower side of the lower hub element in a position circumscribing the rotor shaft. Pinion gears 96 cooperatively engage the bevel gears 94 and 95. The pinion gears are rotatably mounted on a bearing 97 rotatably positioned on the rotor shaft. Pinion positioning rods 98 are employed to hold the rotational axes of the pinion gears in fixed position relative to the aircraft by being secured to the fuselage thereof. The gear elements being so engaged, rotation of the rotor shaft in one direction results in an opposite rotation of the lower hub element. To maintain the lower hub element in proper position an annular thrust bearing 99 is mounted on the rotor shaft just above the said hub element.

A pair of rotor vanes 100 having spars members 101 for support are mounted on each hub element. Pillow blocks 102 are secured to the hub elements in upwardly extending positions. Bearings 103 are mounted in the pillow blocks and are aligned to support the spars. The said spars are rotatably mounted therein radially extended from the hub elements.

In this modification of the invention, inner and outer thrusts of the spars are opposed by single thrust rings 104 secured to each spar. The spars are held in place by the abutting of the thrust rings by the bearings 103.

Feathering arms 105 and pitch arms 106, similar to feathering arms 74 and pitch arms 75 in the preferred form of invention are secured to the thrust rings. Feathering springs 107, similar to feathering springs 76, Fig. 6, are positioned between the feathering arms and their respective hub elements so as to exert their forces in a manner tending to feather the rotor vanes. Stud bolts 108, limiting nuts 109, and lock nuts 110; similar to bolts 77 and nuts 78 and 79, Fig. 6, respectively are mounted on the hub elements in a similar manner to limit the feathering of the vanes to angles of attack suited to autorotation.

Translation cylinders 111, similar to cylinders 80, are mounted on the lower surfaces of the hub elements having their longitudinal axes substantially in the plane of movement of the pitch arms. Substantially fluid tight pistons 112 are slidably mounted in the cylinders. Connecting rods 113 are articulately connected to the pistons and to the pitch arms so as to translate movement of the pistons in response to increased fluid pressure in the cylinders into increased angles of attack of the rotors in opposition to the feathering springs.

Fluid conductors 114 are employed to provide substantially fluid tight communication between the upper translation cylinders and their respective activating assemblies. Openings 115 in the rotor shaft are provided to permit fluid communication between each fluid conductor and its respective fluid ring in the transfer bearing 90.

As the rotor shaft rotates in the counterclockwise direction as viewed in Fig. 8, the upper hub element and supported members rotate with it. The lower hub element and supported members rotate in a clockwise direction. During each rotation, spars supported by opposite hub elements but controlled by the same hydraulic system lie in a common vertical plane of the rotor shaft. This plane is referred to as the reference plane. At all times during rotation, rotor vanes whose angles of attack are controlled by the same fluid conductor will be either in the reference plane or equally and oppositely displaced from the reference plane.

It is obvious, therefore, that this modification of the invention permits vertical control and horizontal control fore and aft in the reference plane, to be exercised over the aircraft in a manner similar to that described for the preferred embodiment of the invention.

Modification 2

Figures 9, 10:
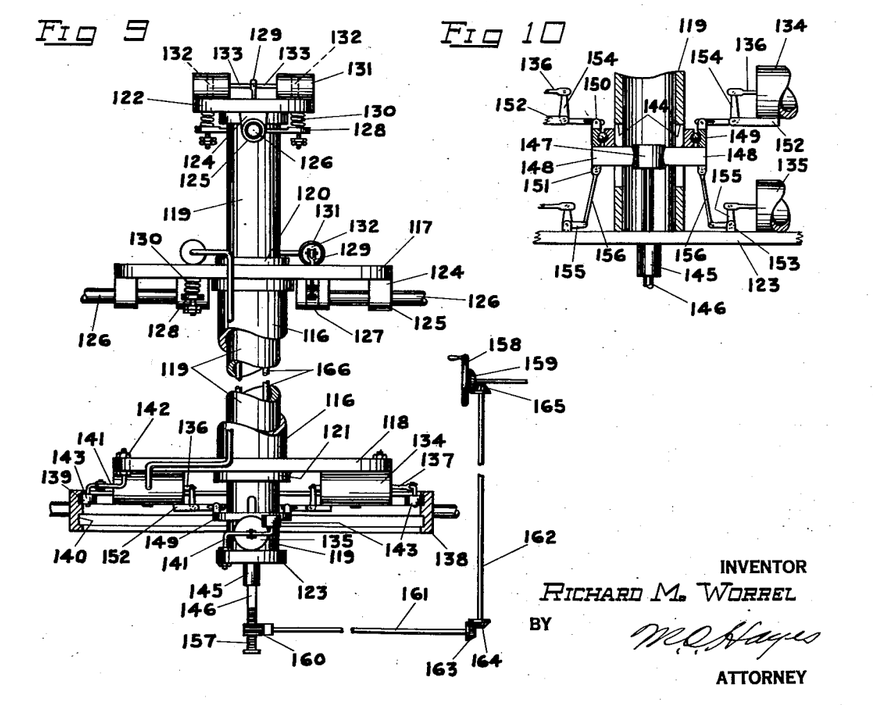
Fig. 9 is a side elevational view of an additional modification of the present invention adapted to the mounting and control of coaxially mounted rotors.
Fig. 10 is a vertical sectional view of the central portion of the activating assemblies of the second modification, the lower activating assembly being rotated substantially 90° to lie in the same vertical plane as the upper activating assembly as shown in Fig. 9.

In Figs. 9 and 10 a further modification of the present invention is shown providing 360 degrees azimuthal control for an aircraft having coaxially arranged and oppositely rotating rotor shafts.

An outer, cylindrical, hollow rotor shaft 116 is mounted substantially vertically disposed within the fuselage of the aircraft and is rotatably driven as previously described. The outer rotor shaft extends upwardly beyond the aircraft to a height sufficient to mount a rotor and downwardly to mount an hydraulic activating assembly.

A hub element 117 is fixedly secured to the outer rotor shaft at its upper end portion in a plane substantially at right angles to the rotor shaft. An azimuth plate 118 is secured to the outer rotor shaft at its lower end portion also in a plane substantially at right angles to the rotor shaft.

An inner rotor shaft 119 is coaxially aligned with the outer rotor shaft and is mounted within and supported thereby. The inner rotor shaft extends upwardly from the outer rotor shaft a distance in keeping with the vertical spacing of the rotors and downwardly from the outer rotor shaft a distance sufficient to mount an activating assembly presently more fully described. An upper positioning bearing 120 is secured to the inner rotor shaft in circumscribing position to bear against the upper end of the outer rotor shaft. Similarly a lower positioning bearing 121 is secured to the inner rotor shaft to bear against the lower end of the outer rotor shaft. The cooperatively employed positioning bearings maintain the inner and outer rotor shafts in predetermined relative positions.

The inner rotor shaft is rotated by conventional driving means, such as bevel gear linkage, in a direction opposite to the rotation of the outer shaft. The means for driving the inner shaft, like that for the outer shaft, are not component parts of the present invention and thus are not shown.

An upper hub element 122 and a lower azimuth plate 123 are secured to the upper and lower end portions respectively of the inner rotor shaft. In Fig. 9, the inner rotor shaft is rotated one quarter turn with respect to the outer rotor shaft to show the azimuth plates and hub elements at right angles to each other.

Pillow blocks 124 and bearings 125, similar to those already described, are secured below the hub elements. Rotor vanes having spars 126 are rotatably mounted in the bearings so as to radially extend from the hub elements. Thrust rings 127 are secured circumjacent the spars and are employed to retain the spars within the bearings by being positioned between a pair of such bearings, as previously described in the first modification. To control the angles of attack of the rotor vanes, feathering arms 128 and pitch arms 129 are radially extended from the thrust rings and fixedly attached thereto. Helical feathering springs 130 are positioned between the feathering arms and the hub elements to have a rotor vane flattening influence as before.

Translating cylinders 131 are secured to the upper portions of the hub elements so as to have their longitudinal axes substantially in the plane of rotation of the pitch arms. Substantially fluid tight pistons 132 are slidably engaged within the hydraulic cylinders. Connecting rods 133 are articulately connected to the pistons and to the upper end portion of the pitch rods to translate outward movement of the pistons into increased angles of attack of the rotor vanes.

Control cylinders 134 are radially secured to the lower side of the upper azimuth plate 118. Similar lower control cylinders 135 are radially secured to the upper side of the lower azimuth plate 123. As shown in Fig. 2, and as previously described, outwardly and inwardly disposed substantially fluid tight pistons are slidably mounted in the control cylinders. Inwardly disposed connecting rods 136 and outwardly disposed connecting rods 137 are articulately connected to their respective pistons.

An annular race element 138 is positioned circumjacent the cylinders as before. The race element has an upper track 139 and a lower track 140 formed on its inwardly disposed surface. The support and manipulation of the race element is accomplished in a similar manner as the support and manipulation of the race element 27 previously described and as illustrated in Figs. 2, 3, and 4. The oppositely rotating azimuth plates have opposing torque effects and no torque compensating means need be employed.

Offset drag levers 141 are pivotally supported in the azimuth plates near the side thereof leading their respective cylinders during rotation. The axes of pivot of the drag levers are determined by forming mounting openings vertically in the azimuth plates and by securing mounting bearings 142 to the drag levers to bear against each side of the azimuth plates. Rollers 143 are rotatably mounted in the outer end portions of the drag levers to engage their respective tracks 139 and 140. The drag levers are offset sufficiently, first, to intersect extended longitudinal axes of the control cylinders, and second, a further amount, to properly position the rollers in their respective tracks 139 and 140. It is to be borne in mind that the rotating rollers revolve in opposite directions in their respective tracks. The mounting of the rollers and the spacing of the tracks take into consideration the necessity of their in no way interfering with one another's operation.

The impressing of base pressures on the several hydraulic systems is accomplished in a manner somewhat similar to that previously described with alterations necessitated by the fact that the inwardly disposed pistons, to be controlled uniformly, are borne by oppositely rotating azimuth plates. Fig. 10 illustrates the manner in which the operation is accomplished. It is pointed out that the respective positions of the various parts in Fig. 10 is that which occurs when the oppositely rotating azimuth plates are aligned. Fig. 10 indicates, partially in elevation and partially in cross section the mechanical linkage in question. The inner rotor shaft 119 is indicated in cross section. The lower azimuth plate 123 is shown mounted on the inner rotor shaft 119 as described. A pair of longitudinal guide slots are indicated at 144. A centering bearing 145 is secured to the lower azimuth plate to have its longitudinal axis aligned with the axis of rotation of the rotor shaft and azimuth plates. An elevator control rod 146 is slidably engaged within the centering bearing and is extended through an opening in the lower azimuth plate upwardly into the inner rotor shaft.

An elevator bearing 147 is mounted on the upwardly extended end portion of the elevator rod by having its inner race secured thereto. Arm members 148 are secured to the outer race of the elevator bearing and extended radially through the guide slots 144. So positioned the arm members are turned with the inner rotating shaft without rotating the elevator control rod.

A secondary bearing 149 is slidably positioned circumjacent to the inner rotor shaft and is connected to the arm members by having its inner race secured thereto. The outer race remains free to rotate independently. Ears 150 and 151 are upwardly and downwardly extended from the outer bearing race of the secondary bearing and the arm members respectively.

A bell crank mounting plate 152 is secured to the lower portions of the control cylinders of the upper azimuth plate as previously described. The present mounting plate differs from mounting plate 64 in that it is adapted to mount two instead of three bell cranks. The lower azimuth plate being below the control cylinders, no lower bell crank mounting plate is required. Instead, upwardly extended flanges 153 are secured to the lower azimuth plate in position to accomplish the same function.

Upper bell cranks 154 are pivotally mounted in the bell crank mounting plate 152 provided therefor. Lower bell cranks 155 are pivotally mounted on the lower azimuth plate 123 by means of the flanges 153. One leg of each of the upper bell cranks is articulately connected to the upwardly disposed ears 150 of the outer bearing race of the secondary bearing and the other leg to the inwardly disposed connecting rod 136 of the upper control pistons. Push-pull rods 156, articulately communicate between legs of the lower bell cranks 155 and the downwardly disposed ears mounted on the arm member 148. The lower bell cranks are also connected to the inwardly disposed connecting rods of the control pistons of the lower azimuth plate. Thus, a mechanical linkage between the elevator control rod 146 and the inwardly disposed pistons of both azimuth plates is established translating vertical movement of the elevator control rod into radial positioning of the said pistons.

In Fig. 9, a mechanical manipulating means for the elevator control rod 146 is indicated. It is understood that many other manipulating means, such as that indicated in Fig. 2 and previously described, may be advantageously employed. The elevator control rod has a rack 157 formed on its lower end portion. An elevator wheel 158, having a bevel gear portion 159 formed thereon, is rotatably mounted in the aircraft in a convenient operational position. A cylindrical pinion gear 160, for cooperatively engaging the rack; rotatably mounted control shafts 161 and 162, and pinion gears 163, 164 and 165 comprise a mechanical linkage between the elevator wheel and the rack 157. A pair of fluid conductors 166 provide fluid communication between the control cylinders 134 and 135 and their respective translation cylinders.

*Modification 2 operation*

The operation of this modification of the invention is similar to that of the preferred embodiment. The base pressure impressed on the hydraulic systems is controlled by the elevator wheel. Rotational positioning of the elevator wheel is translated into radial positioning of the inner control pistons in both of the azimuth plates through the bevel gear 159, pinion gears 163, 164 and 165, control shafts 161 and 162, rack 157, elevator control rod 146, elevator control bearing 147, arm members 148, secondary bearing 149, push-pull rods 156, bell cranks 154 and 155, and connecting rods 136.

Individual pressure variations for the several hydraulic systems are achieved by moving the joy stick to displace the race element 138. The rollers 143, revolving and rotating in their tracks 139 and 140 respectively, manipulate the drag levers 141, the connecting rods 137 and the outwardly disposed control pistons to position the said pistons in response to their respective azimuthal positions during rotation.

In the manner previously described, the additive pressures in the several hydraulic systems are communicated to the hub assembly through these fluid conductors to achieve hydraulic control of the angles of attack of the rotor vanes.

While I have shown certain embodiments of my invention, it is susceptible to further modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. In combination with an aircraft having rotor vanes for aerial support and locomotion, a rotor vane mounting and hydraulic control system comprising a rotor shaft, an activating assembly for the control system, a hub assembly, and fluid conductors communicating between activating and hub assemblies; the activating assembly comprising an azimuth plate fixedly mounted on the rotor shaft to rotate therewith, control cylinders mounted on the azimuth plate, outwardly and inwardly disposed control pistons slidably mounted in the control cylinders, an annular race member positioned circumjacent the azimuth plate, means for adjustably displacing the race member from the center of rotation of the azimuth plate, connecting means communicating between the race member and the outwardly disposed pistons to vary hydraulic pressures in the control cylinders in response to the race displacement, a monitor cylinder coaxially aligned with the axis of rotation of the rotor shaft, a monitor control piston slidably mounted in the monitor cylinder, fluid conductor means communicating between the chamber of the monitor cylinder and the pressure lubrication system of the engine, mechanical means communicating between the monitor piston and the inwardly disposed control pistons to provide over all increase in hydraulic pressure in the control cylinders, a spring member mounted to oppose movement of the monitor piston in response to increased engine lubrication pressure, adjustment means for controlling the resistance offered by the spring member; and the hub assembly comprising a hub element secured to the upper end portion of the mounting shaft, pillow blocks mounted on the hub element, bearings supported in the pillow blocks for rotatably mounting the rotor vanes radially extended from the hub element, lock rings secured to spars of the rotor vanes in cooperation with the bearings opposing longitudinal movement of the the rotor vanes, feathering arms rigidly secured to the rotor vanes and extending forwardly therefrom in spaced relation to the hub element, helical spring elements mounted on the hub element in cooperation with the feathering arms to rotate the rotor vanes to reduce their angles of attack, adjustable means for limiting the feathering movement to angles of attack best suited to autorotation of the vanes, pitch rods rigidly secured to the rotor vane spars and radially extended therefrom, translation cylinders mounted on the hub elements, translation pistons slidably mounted in the cylinders, and connecting rods communicating between the pistons and the pitch rods in opposition to the force of the feathering springs to control rotor vane angles of attack in response to variations in fluid pressures in the hydraulic systems.

2. A mounting means and control system for severally controlling the angles of attack of vanes mounted substantially radially on a rotor shaft comprising an activating assembly, a hub assembly, and fluid conductors communicating therebetween; the activating assembly comprising an azimuth plate mounted on the rotor shaft, control cylinders mounted on the azimuth plate to rotate therewith, outer and inner pistons slidably mounted in the control cylinders, a race element positioned circumjacent the azimuth plate, positioning means for adjustably arranging the race element in relation to the center of rotation of the azimuth plate, roller means communicating between the race element and the outwardly disposed pistons to vary the hydraulic pressures in the control cylinders in response to displacement of the race element, connecting rods articulately connected to the inwardly disposed control pistons, means for selectively effecting uniform inward and outward movement of the inwardly disposed control pistons through the connecting rods to increase and decrease base pressures in the cylinders; the hub assembly comprising a hub element secured to the mounting shaft, bearing elements rotatably mounting the rotor vanes on the hub element, arm members secured to the rotor vanes, resilient means mounted on the hub element transmitting through arm members forces resistive to increased angles of attack of the vanes, pitch rods secured to the rotor vanes, hydraulic cylinders and pistons mounted on the hub element, connecting rods communicating between the pitch rods and the pistons; and fluid conductors arranged to communicate between control cylinders of the activating assembly and respective cylinders of the hub assembly to control angles of attack of the vanes in response to base pressures and individual control pressures superimposed thereon within the control cylinders.

3. An hydraulic control system, for progressively adjusting the angles of attack of aircraft rotor vanes mounted on a rotor shaft, comprising an azimuth plate rotatably mounted on the rotor shaft, control cylinders mounted on the azimuth plate, pistons slidably mounted in the cylinders, means for progressively controlling the positions of the pistons in response to their azimuthal positions during rotation, a hub element secured to the rotor shaft to rotatably mount the rotor vanes, pitch rods secured to the rotor vanes, translation cylinders mounted on the hub element, pistons slidably mounted within the cylinders, fluid conductors communicating between the cylinders of the azimuth plate and respective cylinders of the hub element, and connecting rods communicating between the pistons in the hub element and the pitch rods.

4. Cooperatively employed hydraulic control systems for rotating bodies, comprising an azimuth plate mounted on said body to rotate therewith, control cylinders radially mounted on the azimuth plate, outwardly and inwardly disposed pistons slidably mounted in the cylinders, means for progressively controlling the positions of the outwardly disposed pistons in response to their azimuthal positions as they rotate, means for imparting simultaneous and substantially equal movement to the inwardly disposed pistons, a hub element secured to the rotating body to rotatably mount elements to be controlled, control rods secured to said elements, translation cylinders, and pistons slidably engaged therein mounted on the hub element, connecting rods communicating between the rods and the pistons, and fluid conductors communicating between the chambers of the azimuth plate cylinders and respective cylinders in the hub element.

5. A control system for progressively controlling angles of attack of rotor vanes for aircraft having rotary means of support comprising an activating assembly having a rotatably mounted azimuth plate, cylinders mounted on the azimuth plate, pistons slidably mounted in the cylinders, means for impressing base pressures upon the cylinders, and means for positioning the pistons in response to azimuthal position of the cylinders to superimpose individual pressure variations on the base pressures, and a hub assembly having a rotatably mounted hub mounting the rotor vanes, cooperatively employed pistons and cylinders mounted on the hub, connecting rods adjusting the angles of attack of the vanes in response to movement of the pistons, and fluid conductors communicating between the cylinders in the activating assembly and hub assembly.

6 In combination with an aircraft having rotor vanes for support, a mechanism for controlling coaxially mounted and oppositely rotating the rotor vanes comprising a rotatably mounted rotor mounting shaft, a hub element secured to the rotor shaft, a similar hub element rotatably mounted on the rotor shaft by a fluid transfer bearing, cooperatively employed gears for rotating the rotatably mounted hub element oppositely to the rotation of the rotor shaft, bearing elements rotatably mounting the vanes on the hub elements substantially radially to the rotor shaft, arm members secured to the vanes, resilient means mounted on the hub element resistive to movement of the arm members tending to feather the vanes, cooperatively employed cylinders and pistons supported on the hub elements, connecting rods communicating movement of the pistons to movement of the arm member in opposition to the resilient means for increasing angles of attack of the vanes, and fluid conductors communicating between a cylinder on each hub element and with hydraulic control activating systems.

7. In an aircraft of the character described, a rotor vane mounting and control mechanism for coaxially arranged counter rotating rotors comprising a hollow cylindrical outer rotor mounting shaft rotatably mounted in a substantially upright position in the aircraft, a hollow cylindrical rotor mounting shaft coaxially arranged within the outer shaft and having outwardly extended end portions, thrust bearings maintaining the inner shaft in proper longitudinal position within the outer shaft, means for rotating the shafts in opposite directions, activating systems supported by the lower end portions of the rotor shafts comprising azimuth plates secured to the said end portions, control cylinders mounted on the azimuth plates to rotate therewith, outer and inner pistons slidably mounted in the cylinders, a race element having a pair of tracks formed on its inwardly disposed surface circumjacent the downwardly extended end portion of the inner rotor shaft, a supporting and positioning means for adjustably displacing the race element in relation to the center of rotation of the azimuth plates, roller means communicating between the track portions of the race element and the outwardly disposed pistons of each azimuth plate to vary the hydraulic pressures in the control cylinders in response to said displacement of the race element, connecting rods articulately connected to the inwardly disposed control pistons, means for adjustably positioning the inwardly disposed pistons to provide uniform base pressure on which the pressure differentials incident to race displacement are superimposed, hub elements fixedly mounted on the upper end portions of the rotor shafts, bearing elements rotatably mounting the rotor vanes on the hub elements, arm members secured to the rotor vanes, resilient means mounted on the hub elements in cooperation with the arm members to resist feathering of the rotor vanes, pitch rods secured to the rotor vanes, cooperatively employed translation cylinders and pistons mounted on the hub elements, connecting rods communicating between the pitch rods and the pistons, and fluid conductors communicating between control cylinders on the azimuth plate and corresponding hydraulic cylinders of the hub element mounted on their respective rotor shafts.

8. In an aircraft of the character described, a rotor vane mounting and control mechanism comprising coaxially arranged rotor mounting shafts rotatably mounted in the aircraft, thrust bearings maintaining the rotor shafts in proper longitudinal relation, activating assemblies mounted on the lower end portions of the rotor shafts comprising azimuth plates secured to said end portions, cylinders mounted on the azimuth plates, pistons slidably mounted in the cylinders, means for positioning the pistons in relation to operator applied base pressure and superimposed pressures in response to azimuthal positions of the cylinders during azimuth plate rotation, hub assemblies mounted on the upwardly disposed end portion of the rotor shafts comprising hub elements secured to said end portions, bearings radially mounting the rotor vanes thereon, cooperatively employed cylinders and pistons mounted on the hub elements, connecting rods adjusting the angles of attack of the rotor vanes in response to movements of the pistons, and fluid conductors communicating between control cylinders in the activating assemblies and corresponding translation cylinders in the hub assemblies.

9. In combination with an aircraft having rotating means for support, a rotor shaft for mounting the rotating means, and an engine for motivating the aircraft; an activating assembly for hydraulic control systems comprising an azimuth plate fixedly mounted on the rotor shaft to rotate therewith, control cylinders mounted on the azimuth plate, outwardly and inwardly disposed control pistons slidably mounted in the control cylinders, an annular race member positioned circumjacent the azimuth plate, means for adjustably displacing the race member from the center of rotation of the azimuth plate, connecting means communicating between the race member and the outwardly disposed pistons to vary hydraulic pressure in the control cylinders in response to the race displacement, a monitor cylinder coaxially aligned with the axis of rotation of the rotor shaft, a monitor control piston slidably mounted in the monitor cylinder, fluid conductor means communicating between the chamber of the monitor cylinder and the pressure lubrication system of the engine, mechanical means communicating between the monitor piston and the inwardly disposed control pistons to provide over all increase in hydraulic pressure in the control cylinders, and fluid conductors communicating between the control cylinders and means being hydraulic controlled.

10. A mechanism for activating a plurality of hydraulic control systems comprising a rotatably mounted azimuth plate, control cylinders mounted on the azimuth plate to rotate therewith, outer and inner pistons slidably mounted in the control cylinders, a race element positioned circumjacent the azimuth plate, positioning means for adjustably arranging the race element in relation to the center of rotation of the azimuth plate, roller means communicating between the race element and the outwardly disposed pistons to vary the hydraulic pressures in the control cylinders in response to displacement of the race element, connecting rods articulately connected to the inwardly disposed control pistons, and means for selectively effecting uniform inward and outward movement of the inwardly disposed control pistons through the connecting rods to increase and decrease base pressures in the cylinders.

11. An activating assembly for hydraulic control systems comprising a rotatably mounted azimuth plate, control cylinders radially mounted on the azimuth plate, outwardly and inwardly disposed pistons slidably mounted in the cylinders, means for progressively controlling the positions of the outwardly disposed pistons in response to their azimuthal positions as they rotate, means for imparting simultaneous and substantially equal movement to the inwardly disposed pistons, and fluid conductor means communicating between the chambers of the cylinders and the hydraulic control systems.

12. In combination with an aircraft having rotor vanes for support, a mechanism for mounting the rotor vanes and for translating control fluid pressures in a plurality of hydraulic control systems into pitch control of the rotor vanes, comprising a rotatably mounted rotor mounting shaft upwardly extended from the fuselage of the aircraft, a hub element secured to the upper end portion of the mounting shaft, bearings supported by the hub element for rotatably mounting the rotor vanes, lock rings secured to spars of the rotor vanes in cooperation with the bearings opposing longitudinal movement of the rotor vanes, feathering arms rigidly secured to the rotor vanes and extending forwardly therefrom in spaced relation to the hub element, helical spring elements mounted on the hub element in cooperation with the feathering arms to feather the rotor vanes, adjustable means for limiting the feathering movement to angles of attack best suited to autorotation of the vanes, pitch rods rigidly secured to the rotor vane spars and radially extended therefrom, cylinders mounted on the hub elements, fluid conductors communicating between the cylinders and the hydraulic control systems, pistons slidably mounted in the cylinders, and connecting rods communicating between the pistons and the pitch rods in opposition to the force of the feathering springs to control rotor vane angles of attack in response to variations in fluid pressures in the hydraulic systems.

13. A control yoke comprising an annular race member adapted to engage elements therein to be controllably positioned, a support arm radially extended from the race member, a pivotally mounted bearing slidably receiving the support arm, a manipulating element radially extended from the race element oppositely disposed to the support arm, and a slide support receiving the manipulating element and constraining the race member to movement in a predetermined plane common to all radii of the race member whereby movement of the manipulating element toward or away from a predetermined neutral position of the race member imparts an equal responsive movement to said race member whereas movement to either side imparts proportionately less sideward movement to the race member as the slide bearing pivots.

14. In a mechanism for controlling a helicopter employing an hydraulic control sytem in pitch controlling relation to rotated support vanes of the helicopter, the combination of control means for the system mounted for revolving movement in a predetermined plane in unitary relation with the rotation of the vanes, an annular race member in circumscribing relation to the control means and in engagement therewith, a support arm radially extended from the race member, a bearing mounted for axial pivotal movement in a plane parallel to the plane of revolution of the control means receiving the support arm for longitudinal slidable movement, a manipulating element radially extended from the race element oppositely disposed to the support arm, and a slide support receiving the manipulating element and through said manipulating element constraining the race member to movement in the predetermined plane of the control means whereby movement of the manipulating element toward and away from the pivoted support arm bearing imparts an equal responsive movement to the race member whereas movement of the manipulating element in directions pivoting said bearing imparts proportionately less sideward movement to the race member than movement toward and away from the bearing.

15. In combination with an engine having a pressure lubrication system in which lubrication pressure varies in response to engine speed variation, and a plurality of hydraulic control systems rotated about a common axis; a monitor assembly for imposing base pressures corresponding to engine lubrication pressures on the control systems comprising a monitor cylinder in fluid communication with the lubrication system of the engine mounted in substantial alignment with the axis of rotation of the control systems, a piston slidably mounted in the monitor cylinder, a piston rod extended from the piston substantially coaxially of the axis of rotation of the systems, a bearing having an inner race mounted on the piston rod and an outer race rotatable thereon, and means interconnecting the other race and the control systems translating movement of the piston in response to engine lubrication pressure variations into responsive hydraulic pressure variations in the several control systems.

16. In a rotary-wing aircraft having an engine provided with a pressure lubrication system in which lubrication pressure varies in response to engine speed variation, and a plurality of hydraulic control systems rotated about a common axis; a monitor assembly for imposing base pressures responsive to lubrication pressures on the plurality of hydraulic control systems comprising a monitor cylinder in fluid communication with the lubrication system of the engine mounted in substantial alignment with the axis of rotation of the control systems, a piston slidably mounted in the monitor cylinder, a piston rod extended from the piston substantially coaxially of the axis of rotation of the systems, resilient means mounted against the piston to resist movement of the piston in response to increased lubrication pressure, manipulable means having control connection to the resilient means for regulating resilient resistance offered to piston movement, a bearing having an inner race mounted on the piston rod and an outer race rotatable thereon, and means interconnecting the outer race and the control systems translating movement of the piston in response to engine lubrication pressure variations into responsive hydraulic pressure variations in the several control systems.

RICHARD M. WORREL.

REFERENCES CITED

The following references are of record in the file of this patent:

UNITED STATES PATENTS

| Number | Name | Date |
| --- | --- | --- |
| 1,274,391 | Davis | Aug. 6, 1918 |
| 1,870,928 | Smith | Aug. 9, 1932 |
| 2,133,043 | Roethenhoefer | Oct. 11, 1938 |
| 2,216,163 | Ray | Oct. 1, 1940 |
| 2,392,341 | Squier | Jan. 8, 1946 |
| 2,393,882 | Blair | Jan. 29, 1946 |
| 2,394,846 | Cox | Feb. 12, 1946 |
| 2,425,651 | Stalker | Aug. 12, 1947 |
| 2,448,073 | Bendix | Aug. 31, 1948 |

FOREIGN PATENTS

| Number | Country | Date |
| --- | --- | --- |
| 610,434 | Germany | Mar. 12, 1935 |